Aug. 30, 1955 G. H. RENISH 2,716,608
METHOD OF HANDLING FROZEN MEATS AND FISH
Filed June 18, 1951
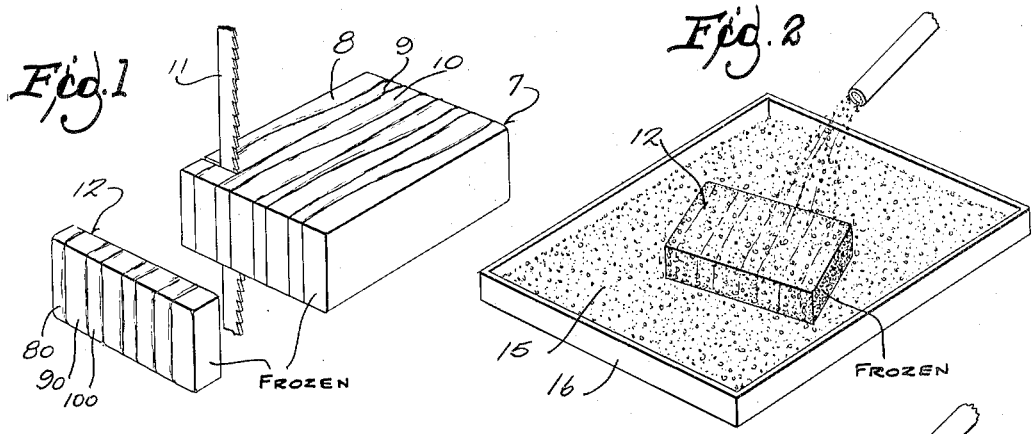
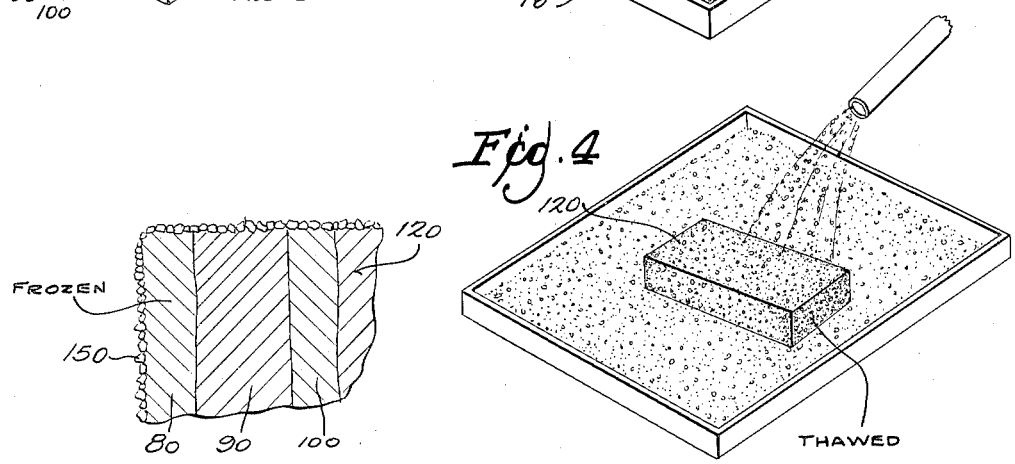
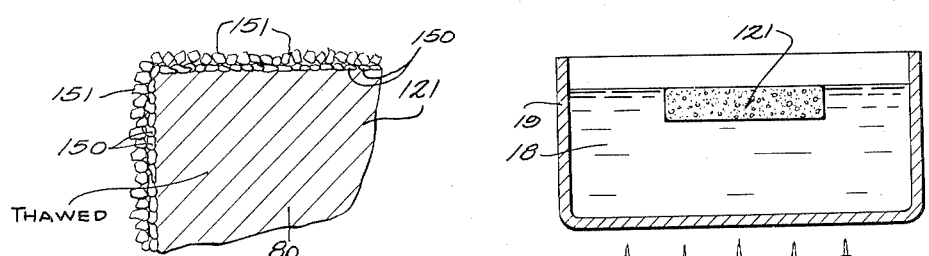
INVENTOR.
GERALD H. RENISH
BY
Wheeler, Wheeler & Wheeler
ATTORNEYS

United States Patent Office 2,716,608
Patented Aug. 30, 1955

2,716,608

METHOD OF HANDLING FROZEN MEATS AND FISH

Gerald H. Renish, Racine, Wis.

Application June 18, 1951, Serial No. 232,128

9 Claims. (Cl. 99—194)

This invention relates to a method of handling frozen meats and fish, and particularly fish, preliminary to frying.

The invention is particularly useful in connection with slices of fish or meat made by cutting transversely through block-frozen fillets or the like. Each such slice will comprise cross-sectional portions of the several fish fillets, or pieces of meat, the cells of which will be exposed on the two cut faces. The invention contemplates that while the slice remains frozen, or at least sufficiently congealed so that the cross sections of the fish or meat remain mutually adherent in the slice, the slice will be breaded, using any desired breading preparation or recipe. The breading is desirably dry when applied but adheres to the flesh by reason of the moistness of its surface and retains the natural juices of the meat or fish which would otherwise escape or evaporate. In addition, the breading, done while the slices are still frozen or congealed, seems to assist in retaining the form of the slice during handling after thawing has been completed.

The invention further contemplates that after the meat or fish is fully thawed (which may proceed at once following the breading, or may occur at some subsequent date), the slice is again breaded. It is then fried in the usual manner.

Quite apart from salvaging natural juices released by the cutting of the meat or fish into slices, the invention is based on my discovery that the freezing operation itself ruptures the cells of the fish or meat so that, upon thawing, the juices are lost, with the result that ordinary frozen fish is notably dry when fried. The breading operation conducted while the slice or piece of fish or meat is still frozen or congealed, not only absorbs juices which would otherwise escape but it so coats the surface of the product as to preclude or greatly reduce evaporation.

In the past, breading has been used solely for its flavor. The present invention contemplates the use of the first breading for the mechanical protection of the product during and subsequent to thawing, but prior to cooking, and the retention of original flavor rather than the addition of flavor to the finished product. It is important to the result that the first breading step be performed prior to the completion of thawing, while the final breading step occurs after thawing is complete.

In the drawings:

Fig. 1 is a view in perspective showing diagrammatically the cutting of a frozen block of fish fillets into slices.

Fig. 2 is a view in perspective diagrammatically showing the first breading step as conducted while the slice is still frozen.

Fig. 3 is a cross section fragmentarily illustrated on an enlarged scale of a portion of the breaded slice.

Fig. 4 is a view similar to Fig. 2 diagrammatically showing the final breading operation, conducted after the previously breaded slice has thawed.

Fig. 5 is a view similar to Fig. 3 fragmentarily illustrating in cross section a portion of the slice following the final breading operation.

Fig. 6 is a view in transverse section through a kettle in which the product is being fried in deep fat.

While the invention is important even where there is no cutting of the fish or meat flesh, it is particularly useful where, as in Fig. 1, the block 7 of frozen fish fillets 8, 9, 10, etc., is transversely cut by the saw 11 into blocks 12. Whenever the flesh of meat or fish is frozen, the cells are ruptured so that, upon thawing, the flavorful juices which normally make the flesh moist and tender, and give it flavor, are permitted to evaporate or run away.

According to the present invention, while the slice 12 is still frozen, or at least so congealed that its fillet sections 80, 90, and 100 remain firmly adherent, the slice is subjected to a first breading operation shown in Fig. 2. Corn meal or bread or cracker crumbs are commonly used. There are commercially prepared products specially designed for the purpose. With or without a coating of milk or egg, but preferably without such coating at this stage, the slice 12 is placed upon the crumbs 15 as the latter rest on the table surface 16. The flesh is then manipulated with respect to the crumbs until the entire surface is thoroughly breaded. This can be done by turning the slice over and over in the crumbs while pressing it against them, or the crumbs may be placed by hand upon the slice, or they may be blown against it. The mode of application is broadly immaterial. As the result of this operation, the slice 120, as shown in Fig. 3, has a coating 150 over its entire exposed surface. This coating prevents evaporation of the released juices, as the latter melt or would otherwise tend to escape, and it absorbs any juices that escape from the ruptured cells.

It is immaterial when the final thawing occurs with respect to the time of the first breading. The slices may be restored to the freezer and retained indefinitely in a frozen condition, or the thawing may proceed immediately following the breading. The latter is the normal procedure. Whenever the thawing is completed, and as a preliminary to the subsequent cooking of the flesh, there is at least one final breading operation, as shown in Fig. 4, wherein the previously breaded slice 120 is re-breaded so that the resulting slice 121 not only has the original coating of breading at 150 but a second external coating of breading at 151. The final coat will be substantially free of natural juices. When such a re-breaded slice is fried in the fat 18 of kettle 19 over the flames of burners 20, the flesh will have a tenderness and juiciness and flavor unknown in previous attempts to fry breaded frozen flesh.

The preferred process may be summarized:

1. The flesh is frozen to unite in blocks the individual fillets of fish or pieces of meat.

2. With the flesh still frozen hard, or at least remaining sufficiently congealed so that the parts are not separate, the block is cut transversely of the fillets or pieces of meat into slices, each of which comprises sections of the several fillets or pieces.

3. While still frozen or congealed, and prior to any appreciable evaporation or running of natural juices, the flesh is subjected to a dry breading operation leaving adherent to all of its surfaces a breading or coating which is sufficiently dry to absorb juices and sufficiently heavy to minimize evaporation from the surface of the flesh. In the preferred practice, partial thawing will have occurred to leave the surface moist so that the dry breading will adhere to the surface of the flesh.

4. Thawing is ultimately completed, usually immediately.

5. The individual cuts or slices or pieces of flesh are rebreaded after thawing.

6. Finally, the flesh is cooked, usually by frying in deep fat.

It will be observed that in this sequence of operations, the freezing is significant but the slicing is not. Whether the flesh be merely frozen or whether it be sliced while frozen, the most important single step is the step of breading while the flesh remains frozen or at least congealed to the point that no substantial flow of juices from the flesh has commenced. Rupture of the cells by freezing is desirable, provided the juices are retained instead of being permitted to escape, such retention being effected by the step of breading prior to completion of thawing.

I claim:

1. In the preparation of pre-frozen flesh for cooking, the subsequent step of breading the flesh while it remains frozen, at least sufficiently to preclude substantial loss of natural juices, the breading providing an absorbent for such juices as they escape during thawing and also serving to reduce evaporation.

2. The method recited in claim 1 in which the flesh is sliced after freezing but prior to breading, whereby the sliced flesh presents cut surfaces to which the breading adheres.

3. The method recited in claim 1 in combination with the further steps of completing the thawing of the flesh and the subsequent re-breading thereof.

4. A method of preparing the flesh of fish and meat for cooking, which method comprises first freezing the flesh, whereby its individual cells are ruptured, and thereafter breading exposed surfaces of the flesh prior to completion of thawing.

5. The method recited in claim 4 in which the flesh is partially thawed prior to said breading and then refrozen.

6. The method of claim 4 in which the flesh is sliced prior to said breading.

7. The method of preparing the pre-frozen flesh of fish and meat for cooking, which method comprises cutting the flesh into slices, whereby to expose cut surfaces of cells ruptured in freezing, dry-breading substantially of all the surfaces of the flesh prior to completion of thawing thereof, whereby such dry breading will absorb escaping juices and reduce evaporation from the cells, subsequently completing the thawing of the breaded slice, and thereafter re-breading the thawed and previously breaded slice preliminary to the cooking thereof.

8. The method recited in claim 7 in which the flesh is partially thawed preliminary to its first breading aforesaid and then refrozen.

9. The product of the method described in claim 3.

References Cited in the file of this patent

UNITED STATES PATENTS 1,864,285   Taylor _____ June 21, 1932

OTHER REFERENCES

"Quick Frozen Foods," February 1950, page 181.
"Quick Frozen Foods," January 1951, pages 82, 83, 84, 86, 87, 88 and 89.
"Quick Frozen Foods," March 1951, pages 9 and 152.
"Quick Frozen Foods," April 1951, page 116.